United States Patent [19]

Cicak

[11] Patent Number: 4,864,100

[45] Date of Patent: Sep. 5, 1989

[54] CONTROLLED ZONE DEFROSTING SYSTEM

[75] Inventor: Michael J. Cicak, Perrysburg, Ohio

[73] Assignee: Glasstech International, L.P., Dover, Del.

[21] Appl. No.: 152,970

[22] Filed: Feb. 8, 1988

[51] Int. Cl.⁴ .............................................. B60L 1/02
[52] U.S. Cl. .................................. 219/203; 219/202; 136/291; 136/293
[58] Field of Search ................ 136/291, 293; 219/202, 219/203

[56] References Cited

U.S. PATENT DOCUMENTS

| | | | |
|---|---|---|---|
| 2,015,279 | 9/1935 | Middleton | 219/203 |
| 2,429,420 | 10/1947 | McMaster | 219/203 |
| 2,675,456 | 4/1954 | Cleminson | 219/203 |
| 4,141,425 | 2/1979 | Treat | 136/291 |

OTHER PUBLICATIONS

Linden, "New Power Sources & Energy Converters", in *Electronics*, vol. 35, #3, 1962, pp. 35–42.

Hill, "Electronics in Engineering", 1961, Chap. 8, Dec. 3, pp. 150–154.

Primary Examiner—H. Broome
Assistant Examiner—Melissa C. Chiu
Attorney, Agent, or Firm—Brooks & Kushman

[57] ABSTRACT

A controlled zone defrosting system is provided for disbursing electrical energy, according to predetermined priorities, to a plurality of defrosting devices, formed of an electrically conductive glass coating material, in an automobile or the like. The defrosting devices could, for example, be effectively located to melt ice formed on such areas as the driver and passenger sides of a windshield, a rear window, etc. The disbursement of electrical energy may, in addition to being dependent on preselected priorities, be made dependent on a number of factors such as time, temperature and the remaining amount of energy. The electrical energy may be supplied by an associated automobile's battery, an independent battery, or an electrical energy generating mechanism such as a photovoltaic device. Available remaining electrical energy may be monitored and, as it is diminished, be disbursed only to zones given top priorities. If a photovoltaic device is used, electrical energy supplied thereby may be disbursed to maintain the charge of an associated battery.

2 Claims, 2 Drawing Sheets

CONTROLLED ZONE DEFROSTING SYSTEM

TECHNICAL BACKGROUND

This invention relates to defrosting systems wherein electrical energy is disbursed to defrost specific zones on an automobile or the like according to predetermined priorities.

DISCLOSURE OF THE INVENTION

In accordance with the present invention, a controlled zone defrosting system is provided that selectively supplies electrical energy to defrosting devices formed of an electrically conductive glass coating material and located at specific areas on an automobile or the like.

One embodiment of the present invention contemplates a defrosting system that is responsive to preselected defrosting zone priorities.

Another embodiment contemplates a defrosting system that is responsive to sensed internal system conditions.

Yet another embodiment contemplates a defrosting system that is responsive to sensed ambient conditions.

Still another embodiment contemplates a defrosting system that may be powered by the battery of the associated automobile or by a separate electrical energy storage device.

Another embodiment of the present invention contemplates a defrosting system that may be powered by a photovoltaic device.

A further embodiment contemplates a defrosting system that may be powered by a photovoltaic device and an electrical energy storage device, which may be the battery of the associated automobile or a separate device.

Another embodiment contemplates a defrosting system that may be powered by a photovoltaic device and an electrical energy storage device such that at least part of the electrical energy generated by the photovoltaic device may be used to recharge the storage device.

BRIEF DESCRIPTION OF THE DRAWINGS

In the drawings, in which like reference characters indicate corresponding parts in all the views.

DETAILED DESCRIPTION OF PREFERRED EMBODIMENTS OF THE INVENTION

Figure 1:
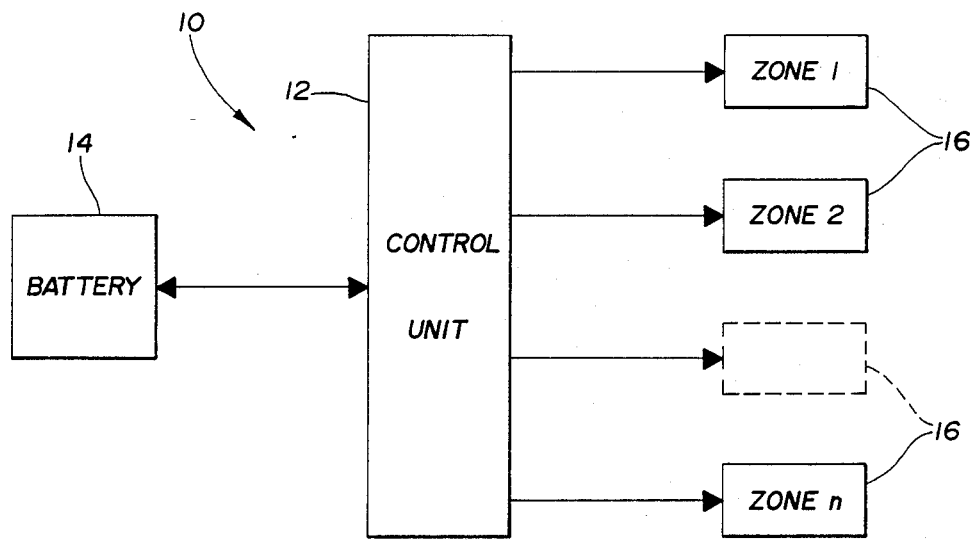
FIG. 1 is a block diagram of an embodiment of the controlled zone defrosting system having a single source of electrical energy.

With reference to FIG. 1, illustrated is a controlled zone defrosting system 10 having a control unit 12 shown connected to an electrical energy storage device, which may be a battery, 14 and also having a plurality of defrosting devices 16 to which the control unit disburses amounts of electrical energy according to preselected priorities. The defrosting devices 16 may be any of a number of well-known devices formed of an electrically conductive glass coating material the resistance of which transforms electrical energy into heat when an electrical current flows therethrough, the heat in turn acting to melt any ice formed on glass bearing the coating material.

Figure 2:
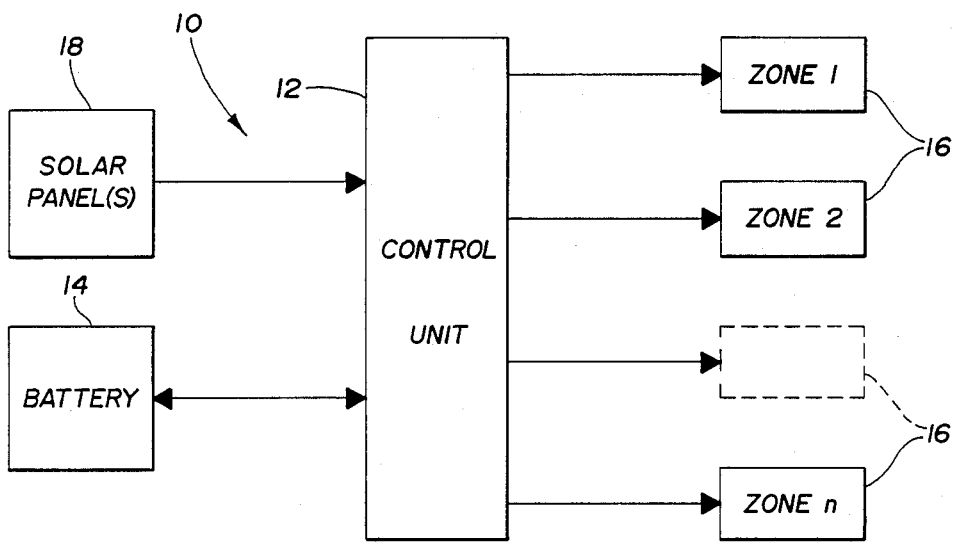
FIG. 2 is a block diagram of an embodiment of the defrosting system having more than one source of electrical energy.

FIG. 2 illustrates another embodiment of the controlled zone defrosting system 10 that also has a control unit 12 shown connected to a battery 14 and to a plurality of defrosting devices 16. Also shown is a photovoltaic device, or solar panel, 18 connected to the control unit 12 to provide an additional supply of electrical energy.

Figure 3:
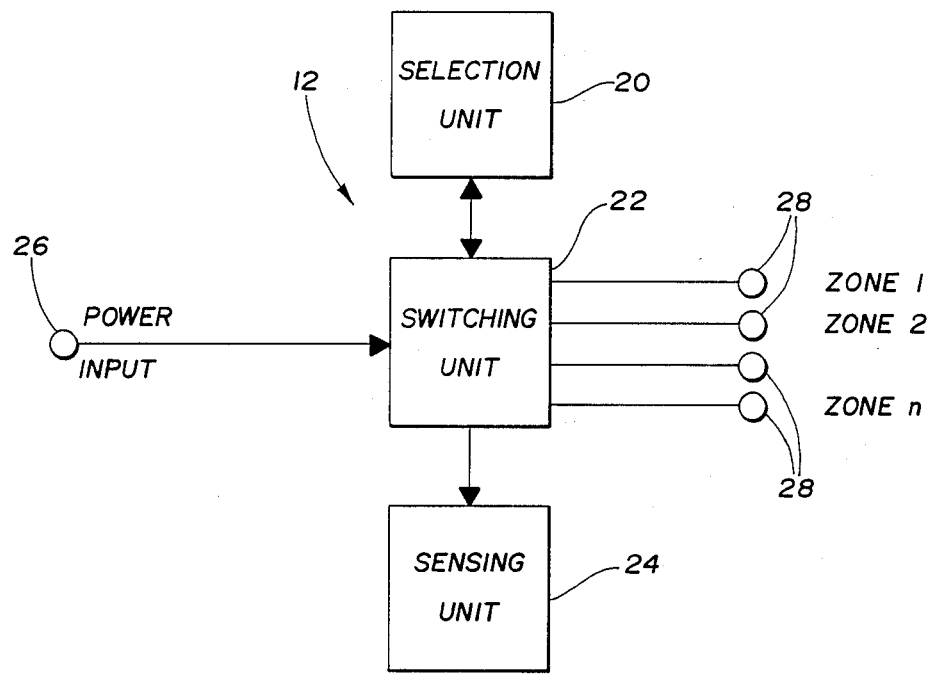
FIG. 3 is a block diagram of the control unit illustrated in FIG's. 1 and 2.

Shown in FIG. 3 is a block diagram illustrating the basic parts of the control unit 12 of the controlled zone defrosting system 10 of FIGs's. 1 and 2. A selection unit 20 is connected to a switching unit 22, as is also a sensing unit 24. A power input coupling 26 having a first input terminal for connecting a battery 14 and a second input terminal for connecting a solar panel 18 to the defrosting system is coupled to the switching unit 22, and output terminals 28 are also connected thereto. p The selection unit 20 has a plurality of switches for selecting zones to which electrical energy is to be directed and also for selecting the criteria governing the energy disbursement. Each zone may represent, on an associated vehicle, an area to be defrosted, for example, the driver side or passenger side of the windshield, the rear window, etc. Electrical energy may also be directed to heaters in, for example, the steering wheel.

The sensing unit 24 includes a plurality of well-known devices for sensing such factors as time, temperature and the electrical energy remaining in the battery. In typical operation, the defrosting system may be set to begin applying electrical energy to the electrically conductive glass coating material of the defrosters located on the driver and passenger sides of the windshield and on the rear window fifteen minutes before the vehicle is to be driven; and to begin applying energy to the steering wheel heater ten minutes later. The energy would be directed to the heating devices in the selected zones only if the temperature is sensed as being below a selected level and only if, or for as long as, the available electrical energy remaining in the battery is sensed as being above a certain level. As the amount of remaining electrical energy decreases, zones having ever higher assigned priorities will no longer be supplied therewith.

The switching unit 22 includes switching devices for connecting electrical energy supplied to the power input coupling 26 to the output terminals 28 as a function of the criteria set into the selection unit 20 and of the conditions monitored by the sensing unit 24.

If a photovoltaic device, or solar panel, 18 is also connected to the control panel 12, as in FIG. 2, its output of electrical energy may be monitored by the sensing unit 24 and used to supplement that obtained from the battery 14. If the output of the photovoltaic device 18 is sufficient, no electrical energy need be taken from the battery 14; in fact, electrical energy generated by the photovoltaic device 18 may be used to recharge the battery 14.

While the controlled zone defrosting system has been shown and described in considerable detail, it should be understood that many changes and variations may be made thereto without departing from the spirit and scope of the invention.

What is claimed is:

1. A controlled zone defrosting system for disbursing electrical energy from a source thereof to preselected defrosting devices disposed at specific locations on a vehicle, said controlled zone defrosting system comprising:

a power input coupling for connecting electrical energy from a source thereof to the defrosting system;

a plurality of electrically operated heaters formed of electrically conductive material for transforming electrical energy into heat when an electric current flows therethrough, said heaters being disposed at specified areas on the vehicle for melting ice formed at those areas, said electrically conductive material being in the form of a coating when said heaters are disposed to defrost glass surfaces;

a plurality of switches forming a selection unit for selecting criteria as a function of which electrical energy supplied to said power input coupling will be electrically connected to specific ones of said heaters;

a plurality of sensing devices forming a sensing unit for monitoring conditions such as the amount of available electrical energy remaining in the source thereof, the time of day, and the temperature; and a plurality of switching devices forming a switching unit electrically connected to said power input coupling, to said selection unit, to said sensing unit and to said heaters for connecting electrical energy from said power input coupling to specific ones of said heaters as a function of the criteria set into said selection unit and of the conditions monitored by said sensing unit.

2. A controlled zone defrosting system for disbursing electrical energy to preselected defrosting devices disposed at specific locations on a vehicle, said controlled zone defrosting system comprising:

at least one electrical energy storage device for storing electrical energy;

at least one photovoltaic device for generating electrical energy in response to light;

a power input coupling electrically connected to said electrical energy storage device and to said photovoltaic device;

a plurality of electrically operated heaters formed of electrically conductive material for transforming electrical energy into heat when an electric current flows therethrough, said heaters being disposed at specified areas on the vehicle for melting ice formed at those areas, said electrically conductive material being in the form of a coating when said heaters are disposed to defrost glass surfaces;

a plurality of switches forming a selection unit for selecting criteria as a function of which electrical energy supplied to said power input coupling will be electrically connected to specific ones of said heaters and to said electrical energy storage device;

a plurality of sensing devices forming a sensing unit for monitoring conditions such as the amount of available electrical energy remaining in said electrical energy storage device, the amount of electrical energy being generated by said photovoltaic device, the time of day, and the temperature; and a plurality of switching devices forming a switching unit electrically connected to said power input coupling, to said selection unit, to said sensing unit and to said heaters for connecting electrical energy from said electrical energy storage device and from said photovoltaic device to specific ones of said heaters or from said photovoltaic device to said electrical energy storage device, for recharging said electrical energy storage device, as a function of the criteria set into said selection unit and of the conditions monitored by said sensing unit.

* * * * *